United States Patent
Hecht

(10) Patent No.: US 8,696,255 B2
(45) Date of Patent: Apr. 15, 2014

(54) CUTTING INSERT HAVING AN ENGAGEMENT PROTRUSION AND CUTTING TOOL THEREFOR

(75) Inventor: Gil Hecht, Nahariya (IL)

(73) Assignee: Iscar, Ltd., Tefen (IL)

(*) Notice: Subject to any disclaimer, the term of this patent is extended or adjusted under 35 U.S.C. 154(b) by 1050 days.

(21) Appl. No.: 12/751,687

(22) Filed: Mar. 31, 2010

(65) Prior Publication Data

US 2010/0254776 A1 Oct. 7, 2010

(30) Foreign Application Priority Data

Apr. 7, 2009 (IL) .......................................... 198052

(51) Int. Cl.
*B23B 27/16* (2006.01)
(52) U.S. Cl.
CPC ..................................... *B23B 27/16* (2013.01)
USPC .......................................... 407/40; 407/113
(58) Field of Classification Search
USPC ............ 407/40, 42, 47, 48, 61, 102, 103, 113
IPC ....................................................... B23B 27/16
See application file for complete search history.

(56) References Cited

U.S. PATENT DOCUMENTS

| | | | |
|---|---|---|---|
| 3,399,442 A | 9/1968 | Jones et al. | |
| 5,599,141 A * | 2/1997 | Katbi et al. | 407/114 |
| 6,942,434 B2 * | 9/2005 | Friedman et al. | 407/113 |
| 7,004,692 B2 | 2/2006 | Hecht | |
| 7,073,987 B2 | 7/2006 | Hecht | |
| 7,775,750 B2 * | 8/2010 | Satran et al. | 407/113 |
| 8,202,026 B2 * | 6/2012 | Satran et al. | 407/113 |
| 8,459,907 B2 * | 6/2013 | Mergenthaler | 408/231 |
| 2002/0066352 A1 | 6/2002 | Satran et al. | |
| 2005/0214080 A1 | 9/2005 | Satran | |
| 2007/0292219 A1 * | 12/2007 | Craig | 407/48 |
| 2009/0136304 A1 * | 5/2009 | Satran et al. | 407/104 |
| 2010/0158620 A1 * | 6/2010 | Spitzenberger et al. | 407/40 |

FOREIGN PATENT DOCUMENTS

JP 2008 018515 1/2008

OTHER PUBLICATIONS

Office Action dated Dec. 8, 2011 issued in counterpart Israeli patent application (No. 198052).
International Search Report in PCT/IL2010/000221, dated Jul. 27, 2010.

* cited by examiner

*Primary Examiner* — Andrea Wellington
*Assistant Examiner* — Alan Snyder
(74) *Attorney, Agent, or Firm* — Womble Carlyle

(57) ABSTRACT

A cutting tool with a cutting insert secured in an insert pocket. The cutting insert has a single outwardly protruding engagement protrusion located on its opposing side surfaces. The engagement protrusion of a respective side surface has an outer surface that defines an imaginary plane that does not intersect any portion of the respective side surface apart from that outer surface. The outer surface of one engagement protrusion engages a major wall of the insert pocket.

17 Claims, 2 Drawing Sheets

US 8,696,255 B2

CUTTING INSERT HAVING AN ENGAGEMENT PROTRUSION AND CUTTING TOOL THEREFOR

FIELD OF THE INVENTION

The present invention relates to a cutting insert and to a cutting tool therefor, the cutting insert having a single engagement protrusion formed on a side surface thereof.

BACKGROUND OF THE INVENTION

Many indexable cutting inserts used for turning, milling or other metal cutting operations include one or more operative and/or non-operative surfaces having non-planar shapes, for example, having concave, convex, bent, sunken, undulating, curly, or bowed shapes, or other different non-planar shapes. The surfaces assume the non-planar shapes, for example, in order to satisfy various constraints arising from functional and geometrical requirements involved in the design of the cutting insert.

Some indexable, double-sided cutting inserts, for example, have two opposing surfaces, e.g., two opposing side surfaces having identical, non-planar shapes. When such a cutting insert is retained in an insert pocket of a cutting tool, a first of the two opposing surfaces may be an operative surface having an associated cutting edge or cutting corner involved in a cutting operation. The operative surface may, for example, function as a rake surface, or as a clearance surface. The second, opposite surface may be uninvolved directly in the cutting operation, that is it may be a non-operative surface, and function as an engagement surface of the cutting insert, for example, by engaging a supporting wall of the insert pocket. When the cutting insert is indexed, for example, the two opposing surfaces interchange positions and thus assume one another's functionality.

However, e.g., referring to the above example, in some instances functional requirements of the operative surface differ from functional requirements for the engagement surface. Therefore, the identical shape of the two interchangeable surfaces may be appropriate, for example, for the functionality of the operative surface, yet inappropriate for the functionality of the engagement surface. For instance, the non-planar shape of the two surfaces may provide desired clearance, cutting and/or chip forming properties for the operative surface, but at the same time provide only deteriorated engagement between the engagement surface and the supporting wall.

Additionally, e.g., due to ordinary imperfections in the manufacture of the cutting insert, even the aforementioned deteriorated engagement may be achieved only through extensive grinding of a plurality of surfaces and edges of each individual cutting insert. The extensive grinding may be expensive, and additionally result in undesired peeling of a coating layer that covers the cutting insert. In addition, the geometry of some cutting inserts results, for example, in the grinding of the edges of the cutting inserts together with the respective engagement surfaces, even though grinding of the edges is not required, and even undesirable.

SUMMARY OF THE INVENTION

Some embodiments of the invention include a cutting insert and a cutting tool therefor. The cutting tool includes a cutting portion formed at an end thereof, the cutting portion including an insert pocket having a cutting insert releasably retained therein. The cutting insert includes a peripheral surface, including at least a first side surface having a single engagement protrusion.

In some embodiments, the first side surface includes a first engagement protrusion, for example, a single, first engagement protrusion, extending on the first side surface, and protruding outwardly with respect to a first background surface of the first side surface. In some embodiments, the background surface may be concave, for example, in order to comply with functional requirements of the cutting insert, e.g., clearance requirements or other cutting requirements. The first engagement protrusion is integrally formed in the cutting insert, forming with the background surface and the rest of the cutting insert a single, unitary, one-piece unit. The first engagement protrusion has a generally planar outer surface, to planarly engage a major wall of the insert pocket. The first engagement protrusion thereby provides for the first side surface, and thus for the cutting insert, proper engagement means with the major wall. The outer surface, for example, defines an imaginary plane that does not intersect any point of the first side surface apart from the outer surface of that side surface, i.e., the imaginary plane does not intersect the first background surface or any edge of the first side surface. Thereby, in some embodiments the outer surface is the only portion of the first side surface to engage, e.g., planarly, the major wall, which may also assume a planar shape.

In some embodiments, the cutting insert is tangential, i.e., the cutting insert is oriented in the cutting tool in such a manner that during a cutting operation on a work-piece the cutting forces are directed along a major (thicker) dimension of the cutting insert. In some of these embodiments, for example, the first engagement protrusion may surround an opening of a through-bore, which extends through the cutting insert and opens out to the first side surface, e.g., to receive a securing component therein. Thus, the first engagement protrusion may be formed in a generally central portion of the first side surface, and assume, for example, a perforated shape, e.g., perforated by the opening of the through-bore. Additionally, in some embodiments, a contour of the engagement protrusion has a generally polygonal shape, whereas in other embodiments the first engagement protrusion may assume other appropriate shapes.

In some embodiments, the cutting insert is a double-sided cutting insert, having a second side surface located opposite the first side surface, wherein the second side surface may be identical to the first side surface. Accordingly, the second side surface may include a second engagement protrusion, e.g., a single, second engagement protrusion, extending on the second side surface, and protruding outwardly with respect to a second background surface of the second side surface. The first side surface and the second side surface may interchange positions, for example, upon indexing of the cutting insert, resulting in engagement of the second engagement protrusion with the major wall.

The engagement protrusion on each respective side surface, may not extend all the way to any edge of the respective side surface, and protrude outwardly, for example, only to a limited extent beyond the respective background surface. Thus, for example, the second engagement protrusion may not extend all the way to any edge of the second side surface, and protrude outwardly, for example, only to a limited extent beyond the second background surface. Therefore, the second side surface, having portions of which located adjacent the cutting area, may function, for example, as a clearance surface, wherein during the cutting operation the second engagement protrusion is relieved from the work-piece, e.g., such that no portion of the second engagement protrusion is operative in, or interferes with, any functionality of the cutting operation. In this way, a cutting insert according to some embodiments of the invention, e.g., a double-sided cutting insert, is provided with both appropriate cutting properties and appropriate engagement means to engage the retaining insert pocket.

In some embodiments, a plurality of outer surfaces of a plurality of cutting inserts according to the present invention, respectively, may be ground to assume their generally planar shape with relative ease and efficiency, e.g., by virtue of protrusion of the outer surfaces beyond other portions of the respective side surfaces. For example, a plurality of cutting inserts according to embodiments of the invention may be arranged on a single base plate, having their respective outer surfaces ground collectively, e.g., in a single, planar grinding operation, without unnecessarily grinding any cutting edges of the respective cutting inserts. This may replace, for example, individual and undesired grinding of a plurality of surfaces and edges of each separate cutting insert.

BRIEF DESCRIPTION OF THE DRAWINGS

For a better understanding of the present invention and to show how the same may be carried out in practice, reference will now be made to the accompanying drawings, in which.

Figure 1:
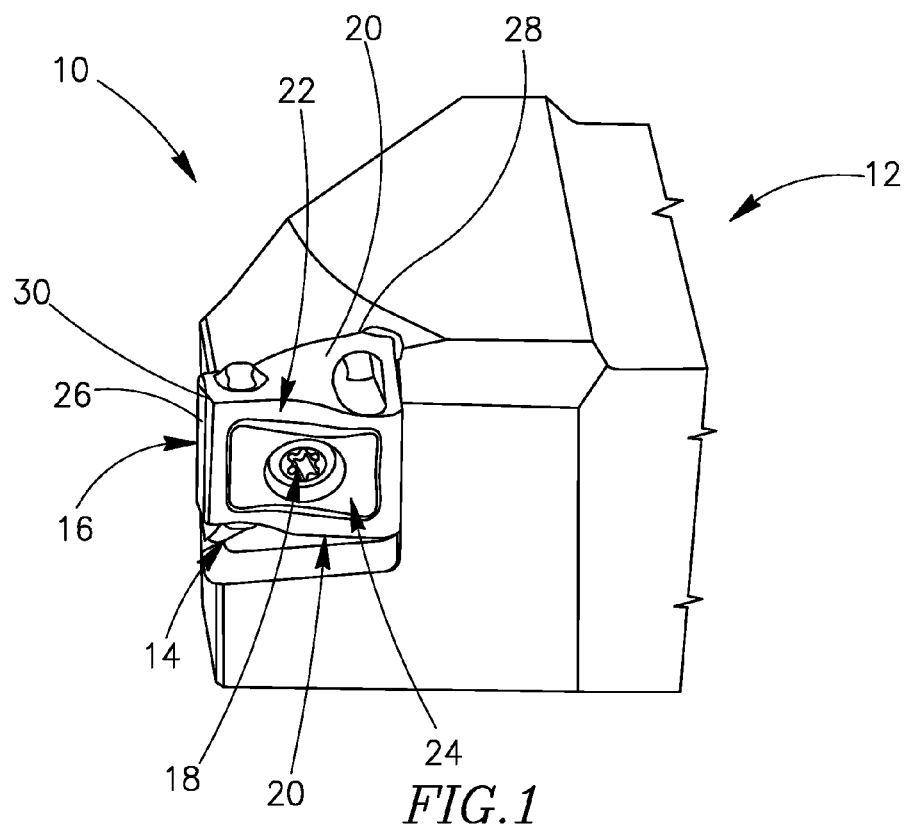
FIG. 1 is a perspective view of a cutting portion of a cutting tool, including an insert pocket having a cutting insert releasably retained therein, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show a turning tool, the present invention is not limited in this respect. For example, embodiments of the invention may refer to other cutting tools, e.g., to milling tools, reaming tools, parting tools, or other metal cutting tools having one or more cutting inserts releasably retained therein.

Additionally, although some drawings herein show a cutting insert having a specific shape, embodiments of the present invention are not limited in this respect. Embodiments of the invention may include, or may refer to cutting inserts having other shapes.

Also, although some drawings herein show, and/or some descriptions herein refer to one or more side surfaces of the cutting insert that assume a specific position in the cutting insert, and/or perform a specific functionality, embodiments of the invention are not limited in this respect. Accordingly, one or more side surfaces referred to herein may refer to any one of the surfaces of the cutting insert, and/or perform one or more of a plurality of functionalities associated with the cutting insert.

Reference is made to FIG. 1, showing a cutting portion 10 of a cutting tool 12, in accordance with some embodiments.

Figure 2:
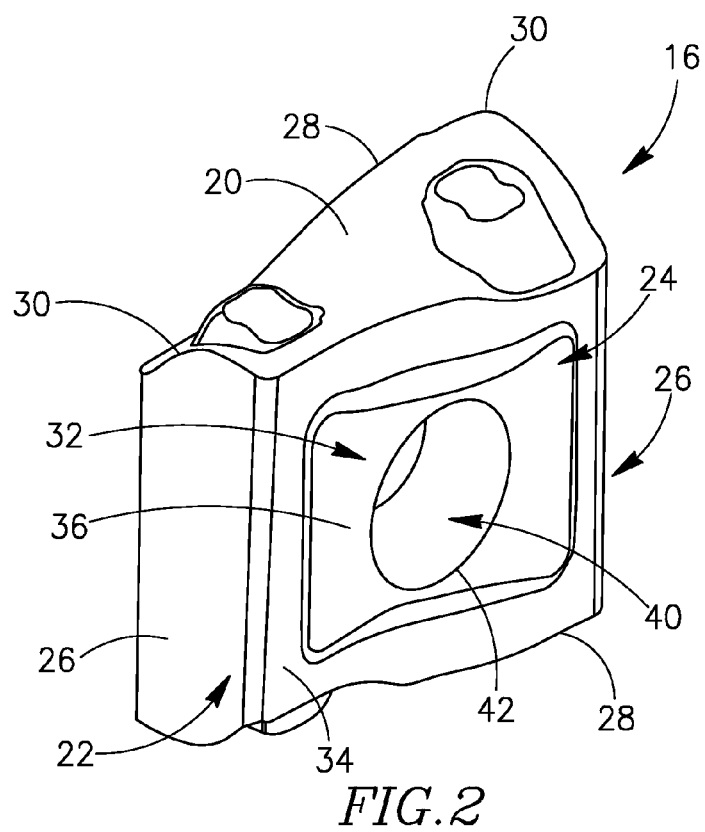
FIG. 2 is a perspective view of the cutting insert of FIG. 1, in accordance with some embodiments of the invention.

In some embodiments, the cutting portion 10 includes an insert pocket 14 formed at an end thereof, the insert pocket 14 having a cutting insert 16, e.g., an indexable cutting insert, releasably retained therein, secured by a securing component 18, for example, a securing screw. The cutting insert 16 may include two opposing end surfaces 20 and a peripheral surface 22 extending therebetween. The peripheral surface 22 may include one or more side surfaces 24 that function as a clearance surface, and/or as an engagement surface, or have other functionalities. The peripheral surface 22 may additionally include one or more minor surfaces 26, for example, two opposing minor surfaces 26, wherein each minor surface 26 may extend between two opposing side surfaces 24. As seen in FIG. 2, the minor surfaces 26 are different in shape from both the side surfaces 24 and the end surfaces 20. The peripheral surface 22 and the end surfaces 20 meet at respective edges 28, at least a section of which may form respective cutting edges 30.

Reference is made to FIGS. 2-5, showing views of the cutting portion 10, and of components and a cross-section thereof, in accordance with some embodiments of the invention.

In some embodiments, for example, the cutting insert 16 is double-sided, such that the peripheral surface 22 includes two substantially identical, e.g., opposing, side surfaces 24, for example, a first side surface 24' and a second side surface 24". Each of the side surfaces 24 may include a single, engagement protrusion 32, and a background surface 34, respectively. Thus, the first side surface 24' includes a single, first engagement protrusion 32', surrounded, for example, by a first background surface 34'. Similarly, the second side surface 24" includes a single, second engagement protrusion 32", surrounded, for example, by a second background surface 34". Each engagement protrusion 32 may protrude outwardly, e.g., beyond the respective background surface 34, as described in detail below.

Figure 3:
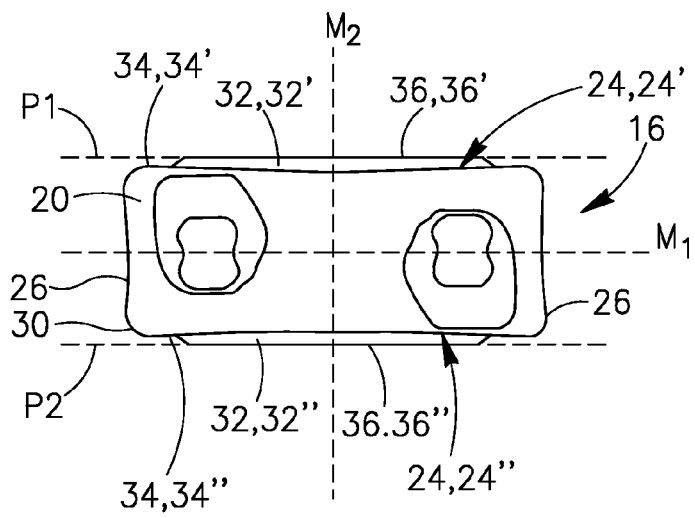
FIG. 3 is a top view of the cutting insert of FIG. 1, in which an imaginary plane P1 is included on a first side and an imaginary plane P2 has been included on a second side.
Figure 4:
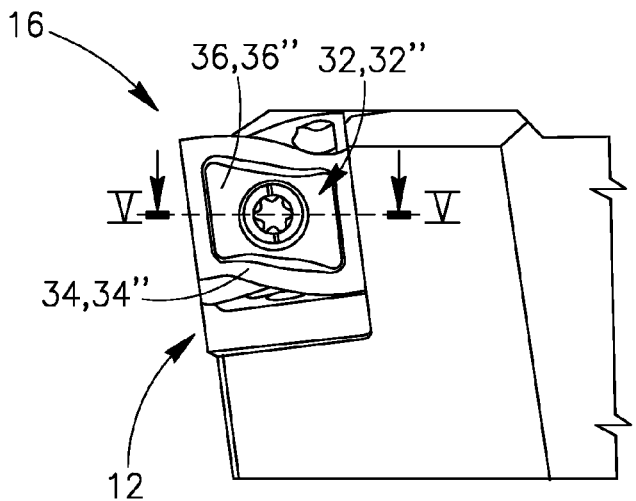
FIG. 4 is a side view of the cutting portion of FIG. 1, in accordance with some embodiments of the invention.

In some embodiments, the background surfaces 34 are concave, e.g., in order to comply with functional requirements of the cutting insert, e.g., clearance requirements or other cutting requirements. Each engagement protrusion 32 does not extend, for example, along the whole of the respective side surface 24, and does not intersect, for example, any of the edges 28 or any of the cutting edges 30, e.g., as shown in FIGS. 2 and 3.

Figure 5:
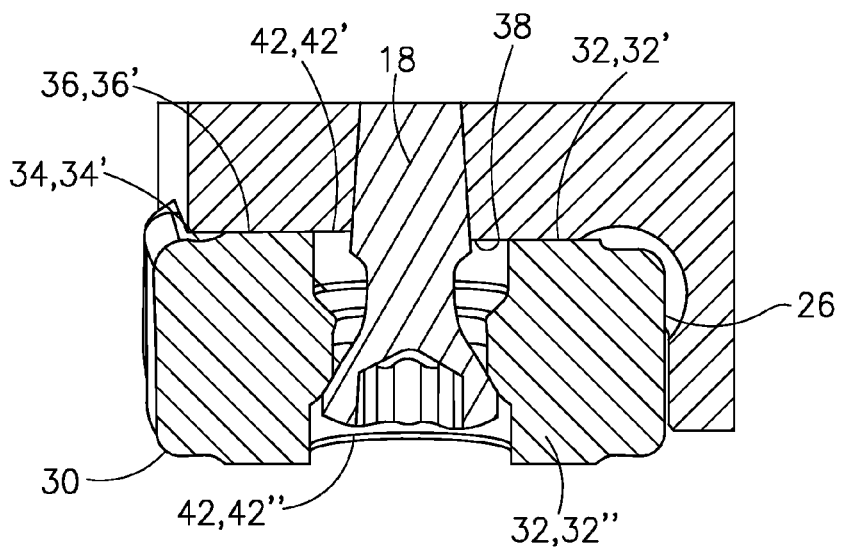
FIG. 5 is a cross-section view of the cutting portion shown in FIG. 4, taken along the line V-V in FIG. 4, in accordance with some embodiments of the invention.

Each engagement protrusion 32 may include a respective outer surface 36, e.g., as described in detail below. The first engagement protrusion 32' thus includes a first outer surface 36', to engage a major wall 38 of the insert pocket 14 upon insertion of the cutting insert 16 in the insert pocket 14, e.g., as shown in FIG. 5, and as described in detail below. The second engagement protrusion 32" similarly includes an outer surface 36", e.g., identical to the first outer surface 36'.

Upon indexing of the cutting insert 16, for example, the first side surface 24' and the second side surface 24" interchange positions.

As described above, each of the engagement protrusions 32 may extend, for example, not all the way to any edge 28 or to any cutting edge 30 associated with the respective side surface 24. In addition, the engagement protrusions 32 may protrude outwardly only to a limited, predefined extent beyond other portions of the respective side surfaces 24. This may provide, for example, sufficient clearance during a cutting operation, between the second engagement protrusion 32", which is not in engagement with the major wall 38, and a work-piece being machined. Thus, the second engagement protrusion 32" is relieved from the machined work-piece during the cutting operation, for example, such that no portion of the second engagement protrusion 32" participates in, or interferes with any functionality of the cutting operation.

In some embodiments, the outer surfaces 36, e.g., the first outer surface 36', may be generally planar, in order to provide planar, surface engagement with the major wall 38. The major wall 38 may therefore assume a complementary, substantially planar shape, to planarly surface-engage the first engagement protrusion 32'. The first outer surface 36', for example, may substantially define an imaginary plane P1, which does not intersect any other portion of the first side surface 24', for example, since the first outer surface 36' protrudes outwardly beyond other portions of the first side surface 24', e.g., as shown in FIG. 3. Therefore, e.g., when the cutting insert 16 is secured in the insert pocket 14, the first outer surface 36' is the only portion of the first side surface 24' that engages the major wall 38, e.g., as shown in FIG. 5. It is understood that the second set of outer surfaces 36" defines a second imaginary plane P2 which is parallel to the first imaginary plane P1. Also, as seen in FIG. 3, in an end view, the entire cutting insert 16 is located between the two imaginary planes.

It can be seen from the foregoing that the background surfaces 34 may thus be recessed relative to their respective outer surfaces 36. Accordingly, when the insert 16 is seated in an insert pocket 14, such as seen in FIGS. 1 and 5, the outer surface 36 of an engagement protrusion 32 of one of the side surfaces 24 engages the major wall 38 of the insert pocket 14 and thus spaces apart the corresponding background surface 24 from the major wall 38.

In some embodiments, e.g., as shown in FIG. 3, a first median plane M1 extends through the two end surfaces 20 and through the two minor surfaces 26, the first median plane M1 extending, for example, parallel to the imaginary plane P. A second median plane M2 may extend through the side surfaces 24 and through the end surfaces 20, the second median plane M2 extending, for example, substantially perpendicular to the first median plane M1. In some embodiments the first and second outer surfaces 36 are parallel to one another, and thus are parallel, for example, to the first median plane M1.

In some embodiments, the cutting insert 16 is tangential. In some of these embodiments, for example, a through-bore 40, extending through the cutting insert 16 to receive the securing component 18 therein, may open out to both the side surfaces 24, defining thereat, respectively, first and second openings 42' and 42". In some embodiments, the second median plane M2 may substantially halve the through-bore 40.

The first engagement protrusion 32', for example, may extend around the first opening 42', e.g., surround the first opening 42', and be perforated thereby. In some embodiments, e.g., in which the cutting insert 16 is double-sided and tangential, the side surfaces 24 may each be larger in area than other surfaces of the cutting insert; for example, each of the side surfaces 24 may be larger in area than each of the minor surfaces 26 and the end surfaces 20. In some embodiments, the second engagement protrusion 32", for example, may extend around the second opening 42", e.g., surround the second opening 42", and be perforated thereby.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A tangential cutting insert (16) comprising:
   two opposing end surfaces (20) and a peripheral surface (22) extending therebetween, the peripheral surface (22) comprising at least a first side surface (24') and a minor surface (26) different in shape from the end surfaces (20); wherein
   a through-bore (40) extends through the cutting insert (16), opening out to the first side surface (24'), defining a first opening thereat;
   the first engagement protrusion (32') surrounds the first opening, and is perforated thereby;
   the first side surface (24') comprises a single, first engagement protrusion (32') extending thereon and protruding outwardly with respect to a first background surface (34') of the first side surface (24'), the first engagement protrusion (32') comprising a first outer surface (36') for engaging a major wall (38) of an insert pocket that releasably retains the cutting insert (16) therein; and wherein
   the first outer surface (36') is generally planar, and defines an imaginary plane (P1) that does not intersect any portion of the first side surface (24') beside the outer surface.

2. The cutting insert (16) of claim 1, wherein:
   the cutting insert (16) is double-sided, the peripheral surface (22) comprising a second side surface (24"), located opposite the first side surface (24') and identical thereto, the second side surface (24") comprising a single, second engagement protrusion (32") having a second outer surface (36"), the second engagement protrusion (32") protruding with respect to a second background surface (34") of the second side surface (24"), wherein the send outer surface (36") is generally planar, defining an imaginary plane (P2) that does not intersect any portion of the second side surface (24") beside the second outer surface (36"); and
   wherein the peripheral surface (22) comprises two opposing minor surfaces (26), each minor surface (26) located between the first and second side surfaces (24', 24"), respectively.

3. The cutting insert (16) of claim 2, wherein the first and second outer surfaces (36', 36") are parallel to one another and are generally parallel to a first median plane (M1), which extends through the two minor surfaces (26) and through the two end surfaces (20).

4. The cutting insert (16) of claim 1, wherein the first engagement protrusion (32') does not extend along the whole of the first side surface (24'), and does not intersect any cutting edge (30) associated with the first side surface (24').

5. The cutting insert (16) of claim 2, wherein first and second background surfaces (34', 34") surround the first and second engagement protrusions (32', 32"), respectively, and wherein the first and second background surfaces (34', 34") are generally concave.

6. The cutting insert (16) of claim 1, wherein:
the cutting insert (16) is double-sided, the peripheral surface (22) further comprising:
  a second side surface (24") identical to the first side surface (24'), located opposite thereto, comprising a second engagement protrusion (32") protruding with respect to a second background surface (34") of the second side surface (24"), the second engagement protrusion (32") comprising a second outer surface (36");
  two opposing minor surfaces (26), each minor surface (26) extending between the first and second side surfaces (24', 24"), respectively;
  wherein the first and second side surfaces (24', 24") are larger in area than any other surface of the cutting insert (16);
  the through-bore (40) opens out to the first and second side surfaces (24', 24"), defining first and second openings (42', 42") at the first and second side surfaces (24', 24"), respectively;
  the first and second engagement protrusions (32', 32") surround the first and second openings (42', 42"), respectively, and are perforated by the first and second openings (42' 42"), respectively;
  the first and second outer surfaces (36', 36") extend mutually parallel to one another, and extend generally parallel to a first median plane (M1), which extends through the two minor surfaces (26) and through the two end surfaces (20);
  each of the first and second engagement protrusions (32', 32") does not extend all the way to any cutting edge (30) associated with the respective side surface (24); and
  the first and second background surfaces (34', 34") surround the first and second engagement protrusions (32', 32"), respectively, wherein the first and second background surfaces (34', 34") are generally concave.

7. A cutting tool (12), comprising at least a cutting portion formed at an end thereof, the cutting portion comprising an insert pocket having a cutting insert (16) in accordance with claim 1 releasably retained therein; wherein:
  the first outer surface (36') of the first engagement protrusion (32') engages a supporting major wall (38) of the insert pocket and is the only portion of the first side surface (24') that engages the major wall (38).

8. The cutting tool (12) of claim 7, wherein:
  the cutting insert (16) is a double-sided cutting insert (16), the peripheral surface (22) comprises a second side surface (24") located opposite the first side surface (24') and identical thereto; the second side surface (24") comprises a single second engagement protrusion (32") extending therealong and having a second outer surface (36"), the second engagement protrusion (32") protruding with respect to a second background surface (34") of the second side surface (24"), wherein the second outer surface (36") is generally planar, defining an imaginary plane (P2) that does not intersect any portion of the second side surface (24") beside the second outer surface (36"); and
  the peripheral surface (22) comprises two opposing minor surfaces (26), each minor surface (26) located between the first and second side surfaces (24', 24"), respectively; and during a cutting operation, no portion of the second engagement protrusion (32") interferes with the cutting operation.

9. The cutting tool (12) of claim 8, wherein the first and second outer surfaces (36', 36") are parallel to one another and are generally parallel to a first median plane (M1) of the cutting insert (16) which extends through the two minor surfaces (26) and through the two end surfaces (20).

10. The cutting tool (12) of claim 7, wherein the first engagement protrusion (32') does not extend along the whole of the first side surface (24'), and does not intersect any cutting edge (30) associated with the first side surface (24').

11. The cutting tool (12) of claim 8, wherein:
  the first engagement protrusion (32') protrudes outwardly with respect to a first background surface (34') of the first side surface (24');
  the first and second background surfaces (34', 34") surround the first and second engagement protrusions (32', 32"), respectively; and
  the first and second background surfaces (34', 34") are generally concave.

12. The cutting tool (12) of claim 7, wherein:
  the cutting insert (16) is double-sided, and the peripheral surface (22) comprises:
    a second side surface (24") identical to the first side surface (24'), located opposite thereto, and comprising a second engagement protrusion (32"); and
    two opposing minor surfaces (26), each minor surface (26) extending between the two side surfaces (24), respectively;
  the first and second side surfaces (24', 24") are larger in area than other surfaces of the cutting insert (16);
  the through-bore (40) opens out to the first and second side surface (24', 24"), defining first and second openings (42', 42") at the first and second side surfaces (24', 24"), respectively;
  the first and second engagement protrusions (32', 32") surround the first and second openings (42', 42"), respectively, and are perforated by the first and second openings (42', 42"), respectively;
  the first and second outer surfaces (36', 36") are parallel to one another, and are generally parallel to a first median plane (M1), which extends through the two minor surfaces (26) and through the two end surfaces (20); and
  the first and second engagement protrusions (32', 32") do not extend all the way to any cutting edge (30) associated with their respective side surfaces (24', 24").

13. A double-sided tangential cutting insert (16) comprising:
  two opposing end surfaces (20) and a peripheral surface (22) extending therebetween, the peripheral surface (22) comprising first and second side surfaces (24', 24"), and two opposing minor surfaces (26), each minor surface (26) being different in shape from the end surfaces (20) and extending between the first and second side surfaces (24', 24"); and
  a median plane (M1) extending through the two minor surfaces (26) and through the two end surfaces (20), wherein:
  each side surface (24', 24") comprises a single engagement protrusion (32', 32") extending thereon and protruding outwardly with respect to a corresponding background surface (34', 34") of the corresponding first side surface (24', 24"), each engagement protrusion (32', 32") comprising an outer surface (36', 36") which is generally planar and defines a corresponding plane (P1, P2) that is parallel to the median plane (M1), wherein:
  in an end view of the cutting insert, the entire cutting insert (16) is located between the two planes (P1, P2).

14. The double-sided tangential cutting insert (16) of claim 13, wherein:

a through-bore (40) extends through the cutting insert (16), opening out to the first and second side surfaces (24', 24") and defining a first opening therethrough; and the engagement protrusions (32', 32") surround the first opening on opposite sides of the insert and are perforated thereby.

15. The double-sided tangential cutting insert (16) of claim 13, wherein:

the engagement protrusions (32', 32") do not extend along the whole of their corresponding side surfaces (24', 24"), and the engagement protrusions (32', 32") do not intersect any cutting edge (30) associated with their corresponding side surfaces (24', 24").

16. The double-sided tangential cutting insert (16) of claim 13, wherein:

each side surface's background surface (34', 34") surrounds a corresponding engagement protrusion (32', 32"); and each side surface's background surface (34', 34") is generally concave.

17. A cutting tool (12), comprising:

a cutting portion comprising an insert pocket (14) having a major wall (38); and a double-sided tangential cutting insert (16) releasably retained in the insert pocket (14), wherein:

the double-sided tangential cutting insert (16) comprises:

two opposing end surfaces (20) and a peripheral surface (22) extending therebetween, the peripheral surface (22) comprising first and second side surfaces (24', 24"), and two opposing minor surfaces (26), each minor surface (26) being different in shape from the end surfaces (20) and extending between the first and second side surfaces (24', 24"); and a median plane (M1) extending through the two minor surfaces (26) and through the two end surfaces (20), wherein:

each side surface (24', 24") comprises a single engagement protrusion (32', 32") extending thereon and protruding outwardly with respect to a corresponding background surface (34', 34") of the corresponding first side surface (24', 24"), each engagement protrusion (32', 32") comprising an outer surface (36', 36") which is generally planar and defines a corresponding plane (P1, P2) that is parallel to the median plane (M1), wherein:

in an end view of the cutting insert, the entire cutting insert (16) is located between the two planes (P1, P2); and the outer surface (36) of an engagement protrusion (32) of one of the side surfaces (24) engages the major wall (38) and thus spaces apart the corresponding background surface (24) from the major wall (38).

* * * * *